US011436603B2

(12) United States Patent
Roche et al.

(10) Patent No.: US 11,436,603 B2
(45) Date of Patent: Sep. 6, 2022

(54) DECISION MAKING FOR ON-LINE TRANSACTIONS

(71) Applicant: U.S. Bancorp, National Association, Minneapolis, MN (US)

(72) Inventors: Michael F. Roche, Minneapolis, MN (US); Kevin Salaman, Minneapolis, MN (US)

(73) Assignee: U.S. Bancorp, National Association, Minneapolis, MN (US)

( * ) Notice: Subject to any disclaimer, the term of this patent is extended or adjusted under 35 U.S.C. 154(b) by 770 days.

(21) Appl. No.: 16/164,609

(22) Filed: Oct. 18, 2018

(65) Prior Publication Data
US 2020/0126085 A1 Apr. 23, 2020

(51) Int. Cl.
*G06Q 20/40* (2012.01)
*G06Q 20/10* (2012.01)
*G06Q 20/36* (2012.01)

(52) U.S. Cl.
CPC ....... *G06Q 20/4016* (2013.01); *G06Q 20/102* (2013.01); *G06Q 20/3674* (2013.01); *G06Q 20/4014* (2013.01)

(58) Field of Classification Search
CPC .................................................. G06Q 20/4016
See application file for complete search history.

(56) References Cited

U.S. PATENT DOCUMENTS

| 9,590,980 | B2* | 3/2017 | Boss | G06F 16/9535 |
|---|---|---|---|---|
| 10,366,378 | B1* | 7/2019 | Han | G06Q 20/4014 |
| 11,004,082 | B2* | 5/2021 | Douglas, Jr. | H04L 63/107 |
| 2007/0022058 | A1* | 1/2007 | Labrou | G06Q 20/3272 |
| | | | | 705/67 |
| 2016/0063500 | A1* | 3/2016 | Sherlock | G06Q 20/3825 |
| | | | | 705/44 |
| 2016/0328715 | A1* | 11/2016 | Gideoni | G06Q 20/401 |
| 2017/0262850 | A1* | 9/2017 | Hammad | G06Q 20/4014 |
| 2018/0060839 | A1* | 3/2018 | Murali | G06Q 40/02 |
| 2018/0082303 | A1* | 3/2018 | Chan-Bauza | G06Q 20/4016 |
| 2019/0122215 | A1* | 4/2019 | Trivedi | G06Q 20/204 |
| 2020/0067918 | A1* | 2/2020 | Brachetti | H04L 63/123 |

* cited by examiner

*Primary Examiner* — Jay Huang
(74) *Attorney, Agent, or Firm* — Foley & Lardner LLP

(57) ABSTRACT

A system and method include receiving, by an authentication system, device data of a computing device used by a customer during a checkout process of a current transaction on a merchant website and contextual data of the customer. The system and method also include retrieving a customer token associated with a payment instrument of the customer, assigning the computing device a device score and the customer a customer score based on the device data and the contextual data, and computing an overall score from the device score and the customer score. The system and method further include determining from the overall score that the current transaction is not fraudulent before the current transaction is completed and auto-filling payment information of the payment instrument in the customer token during the checkout process of the merchant website to complete the current transaction upon determining that the current transaction is not fraudulent.

18 Claims, 8 Drawing Sheets

DECISION MAKING FOR ON-LINE TRANSACTIONS

BACKGROUND

The following description is provided to assist the understanding of the reader. None of the information provided or references cited is admitted to be prior art.

Instead of going to a brick and mortar store, many customers these days prefer to make purchases on-line using a merchant's website. Such on-line transactions are convenient for the customer and many merchants encourage their customers to transact on-line. As such, transactions conducted electronically using the internet are becoming increasingly popular. However, along with the number of on-line transactions, the number of on-line fraudulent transactions and scams are also increasing. Although various fraud detection mechanisms are now available to detect fraudulent transactions and scams, these mechanisms are limited in the way they are configured and the way they operate.

SUMMARY

In accordance with some aspects of the present disclosure, a method is disclosed. The method includes receiving, by an authentication system, device data associated with a computing device used by a customer during a checkout process of a current transaction on a merchant website, receiving, by the authentication system, contextual data associated with the customer during the checkout process, and retrieving, by the authentication system, a customer token associated with the customer. The customer token is associated with a payment instrument of the customer. The method also includes assigning, by the authentication system, the computing device a device score and the customer a customer score based on the device data and the contextual data, computing, by the authentication system, an overall score from the device score and the customer score, and determining, by the authentication system, from the overall score that the current transaction is not fraudulent before the current transaction is completed. The method additionally includes auto-filling, by the authentication system, payment information associated with the payment instrument in the customer token during the checkout process of the merchant website to complete the current transaction upon determining that the current transaction is not fraudulent.

In accordance with some other aspects of the present disclosure, a system is disclosed. The system includes a data collection system associated with a merchant website. The data collection system is configured to collect device data from a computing device used by a customer during a checkout process of a current transaction on the merchant website and contextual data related to the customer. The system also includes an authentication system configured to receive the device data and the contextual data from the data collection system. The authentication system includes a memory to store the device data and the contextual data, and a processing unit configured to retrieve a customer token associated with the customer, such that the customer token is associated with a payment instrument of the customer, assign the computing device a device score and the customer a customer score based on the device data and the contextual data, and compute an overall score from the device score and the customer score. The processing unit is also configured to determine from the overall score that the current transaction is not fraudulent before the current transaction is completed and auto-fill payment information associated with the payment instrument in the customer token during the checkout process of the merchant website to complete the current transaction upon determining that the current transaction is not fraudulent.

In accordance with yet other aspects of the present disclosure, a non-transitory computer readable media with computer-executable instructions embodied thereon is disclosed. The instructions when executed by a processor of an authentication system cause the authentication system to perform a process. The process includes receiving device data associated with a computing device used by a customer during a checkout process of a current transaction on the merchant website, receiving contextual data associated with the customer during the checkout process, and retrieving a customer token associated with the customer. The customer token is associated with a payment instrument of the customer. The process also includes assigning the computing device a device score and the customer a customer score based on the device data and the contextual data, computing an overall score from the device score and the customer score, and determining from the overall score that the current transaction is not fraudulent before the current transaction is completed. The process further includes auto-filling payment information associated with the payment instrument in the customer token during the checkout process of the merchant website to complete the current transaction upon determining that the current transaction is not fraudulent.

In accordance with some other aspects of the present disclosure, a method is disclosed. The method includes creating, by an authentication system, a customer token during a checkout process of a current transaction on a merchant website, receiving, by the authentication system, device data related to a computing device used by the customer during the current transaction and contextual data related to the customer, and assigning, by the authentication system, the computing device a device score and the customer a customer score based on the device data and the contextual data. The method also includes computing, by the authentication system, an overall score from the device score and the customer score, determining, by the authentication system, from the overall score that the current transaction is not fraudulent before the current transaction is completed, and receiving, by the authentication system, payment information associated with a payment instrument from the customer during the checkout process. The method further includes associating, by the authentication system, the payment instrument with the customer token and completing, by the authentication system, the current transaction.

In accordance with yet other aspects of the present disclosure, another method is disclosed. The method includes receiving, by an authentication system, device data associated with a computing device used by a customer during a checkout process of a current transaction on a merchant website, receiving, by the authentication system, contextual data associated with the customer during the checkout process, and retrieving, by the authentication system, a customer token associated with the customer. The customer token is associated with a payment instrument of the customer. The method also includes assigning, by the authentication system, the computing device a device score and the customer a customer score from the device data and the contextual data, computing, by the authentication system, an overall score from the device score and the customer score, and determining, by the authentication system, from the overall score that the current transaction is fraudulent before completing the current transaction. The method further includes initiating, by the authentication system, an additional security protocol to confirm whether the current transaction is fraudulent.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
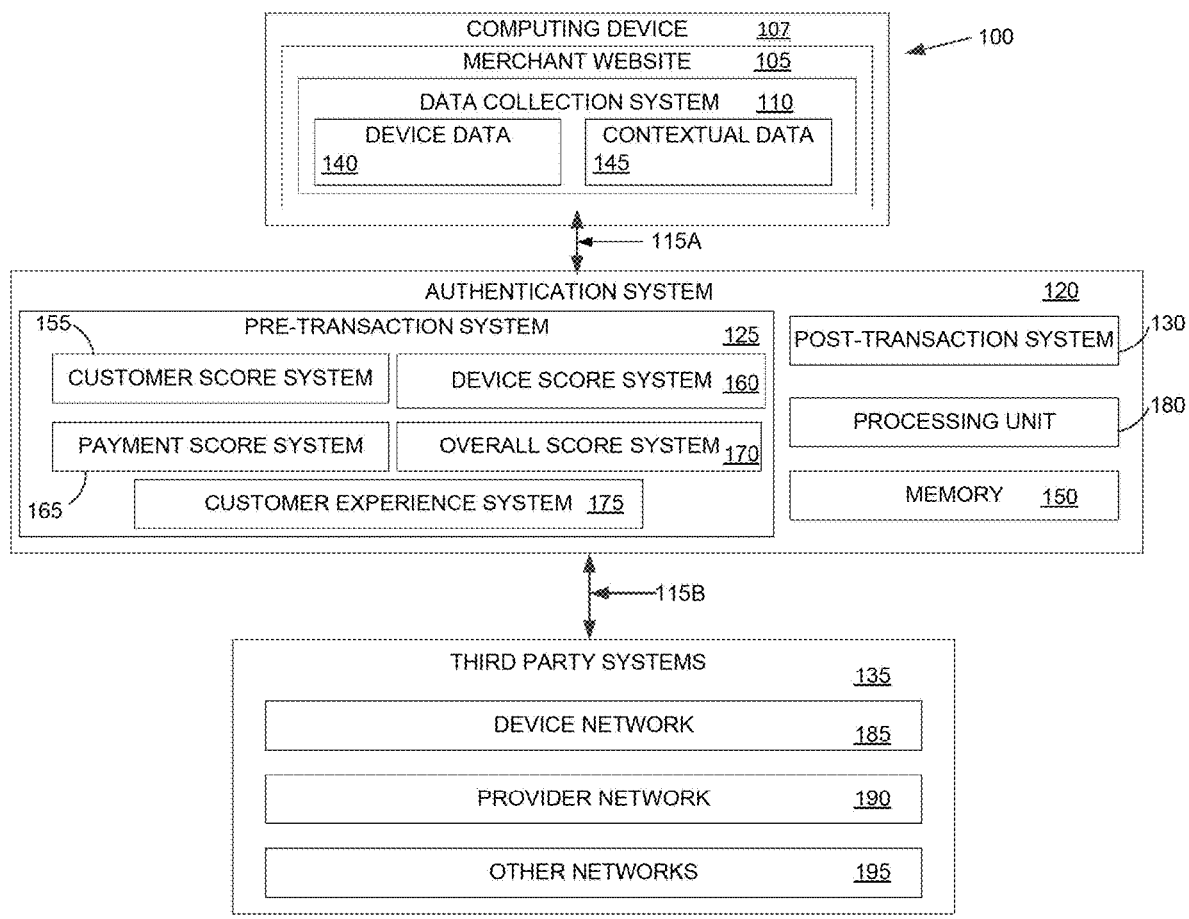
FIG. 1 is an example block diagram of a decision making system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is directed to a decision making system that is configured to detect and prevent fraudulent transactions on a merchant website, as well as configure a customer's checkout experience based upon a transaction being considered fraudulent. Some fraud detection systems may be configured to operate retroactively. In other words, some fraud detection systems may be configured to detect a fraudulent transaction after the transaction has completed. Although mechanisms may be put in place to possibly avoid such fraudulent transactions in the future, once a fraudulent transaction has actually occurred, the fraud cannot generally be undone. Other fraud detection systems are configured to operate pro-actively (e.g., before a transaction is completed) by employing various security protocols that require the customer to complete additional steps before completing a transaction. For example, these security protocols may ask the customer to answer security questions, log into various accounts, generate on-time use credit card numbers, enter verifications codes, etc. during checkout before allowing the customer to place an order on a merchant website. These pro-active fraud detection systems operate on the premise that all transactions are likely fraudulent. While such pro-active fraud detection systems may be effective to some extent in preventing fraudulent transactions, these systems are overly complicated for the customer.

The customer may not want to go through the additional steps before completing a transaction on a website, particularly on a website that the customer frequently transacts from. Complying with the added security protocols is also time consuming, requires the customer to remember additional codes/passwords/usernames, etc., and is generally inconvenient. Compliance with the added security protocols may be particularly frustrating for the customer if the customer believes that the likelihood of a fraudulent transaction is low. A frustrated customer may resort to buying the same goods/services from another merchant or source, thereby resulting in lost sales for the original merchant. Thus, the present disclosure provides technical solutions to detect fraudulent transactions pro-actively before a transaction is completed, while improving the customer's experience in completing the transaction. Specifically, the present disclosure requires the customer to go through the additional security protocols only if the likelihood of a fraudulent transaction is high.

Thus, the present disclosure provides an authentication system that collects a variety of data and determines whether a transaction is fraudulent based upon the data. Specifically, the authentication system is associated with a data collection system that is configured to gather device data from a computing device that the customer is using for accessing a merchant website and completing a particular transaction. The data collection system is also configured to collect a variety of contextual data related to the customer. The authentication system receives the device data and contextual data from the data collection system and determines if the particular transaction is fraudulent. Specifically, the authentication system may combine the current data (e.g., the received device data and contextual data) with historical data (e.g., historical device data and historical contextual data) to determine whether the particular transaction is fraudulent.

In some embodiments, the authentication system may communicate with one or more fraud detection networks to obtain the historical device data, historical contextual data, and customer's transaction history (e.g., past transactions), and compute at least a device score and a customer score. The device score may determine how trustworthy the computing device of the customer is. In other words, the device score may determine whether the computing device has been compromised in any way (e.g., stolen, hacked) and whether the computing device has been used to make fraudulent transactions in the past. The customer score may establish the trustworthiness of the customer. In other words, the customer score may determine whether the customer has made fraudulent transactions in the past. In some embodiments, the authentication system may also compute a payment score, which may verify the authenticity and validity of the payment instrument being used by the customer during the particular transaction. In some embodiments, the authentication system may combine the customer score and the payment score into a single customer score.

Further, the authentication system is configured to compute an overall score from the device score and the customer score, and compare the overall score with a fraud threshold. Based on the comparison, the authentication system decides whether the particular transaction is fraudulent. If the authentication system determines that the transaction is not fraudulent, the authentication system greatly simplifies the checkout process for the customer during the particular transaction. For example, the authentication system may auto-fill payment information for the customer on a payment page for customer's convenience. The authentication system may also remove the additional security protocols from the checkout process, since the particular transaction has been determined to be not fraudulent. Thus, the authentication system reduces the number of checkout steps for the customer in completing the transaction, thereby improving customer experience and increasing the likelihood that the customer continues to return and shop on the merchant website.

On the other hand, if the authentication system determines that the particular transaction is fraudulent, the authentication system may request additional information from the customer to confirm whether the transaction is indeed fraudulent or not. For example, the authentication system may initiate a 3D secure protocol that authenticates the customer and the payment instrument being used by the customer during the particular transaction. If the authentication system is unable to confirm from the additional security protocols that the particular transaction is not fraudulent, the authentication system may request the customer to use an alternative, more secure, form of payment to complete the particular transaction. Thus, even if the authentication system determines that a transaction is fraudulent, to account for the minimal chance that the authentication system's determination of fraud is faulty, the authentication system allows the customer to complete the transaction using another form of payment, such as PayPal, which is more secure. If the customer decides not to use the alternative form of payment, the authentication system prevents the particular transaction from going through, thereby averting a fraudulent transaction.

Further, the authentication system is configured to compute the fraud threshold that is used to detect threshold and continuously refine the fraud threshold to increase the accuracy of fraud detection. Thus, the authentication is a self-learning system that updates the fraud threshold based on historical data to improve the accuracy of fraud detection in the future.

Thus, the present disclosure provides a mechanism which not only improves customer experience but also improves the operation of the authentication system in pro-actively detecting fraud with great accuracy and tailoring the customer's experience based on the fraud detection. Based upon the fraud detection, the number of steps during the checkout process for the customer may be reduced. Further, by auto-filling the payment information, the authentication system increases customer convenience and decreases the overall time to complete the particular transaction without compromising on the fraud detection. In some embodiments, the authentication system may detect fraudulent transactions in real time or substantial real time (e.g., in the order of milliseconds), or at least between the time the customer starts the checkout process and reaches the payment page of the checkout process.

Referring now to FIG. 1, an example block diagram of a computer implemented decision making system 100 is shown, in accordance with some embodiments of the present disclosure. The decision making system 100 is configured to make one or more decisions during an online transaction (also referred to herein as "transaction") by a customer. As used herein, "online transaction" or "transaction" means buying/selling goods and/or services on a merchant website by the customer. "Customer" as used herein means a person, organization, or entity that is buying/selling the goods/services on the merchant website. The decision making system 100 is configured to detect fraudulent transactions in real time (or substantial real time) before the transaction is completed (e.g., before the goods/services are bought/sold) and tailor the customer's buying/selling experience during the transaction based upon the assessment of whether the transaction is fraudulent or not.

The decision making system 100, thus, includes a merchant website 105 that is accessed by the customer on a computing device 107. The merchant website 105 has a data collection system 110 associated therewith to collect a variety of data that is transmitted via a network 115A to an authentication system 120. The authentication system 120 includes a pre-transaction system 125 and a post-transaction system 130, both of which receive the data from the data collection system 110 and perform pre-transaction and post-transaction processing, respectively, to detect fraudulent transactions. The authentication system 120 communicates with third party systems 135, via a network 115B, to perform the pre-transaction and post-transaction processing in the pre-transaction system 125 and the post-transaction system 130, respectively.

It is to be understood that only some components of the decision making system 100 are shown and described herein. Nevertheless, other components that are needed or considered desirable to have in the decision making system 100 to perform the functions described herein are contemplated and considered within the scope of the present disclosure.

The merchant website 105 is any collection of web pages that allows the customer to buy/sell goods/services. The merchant website 105 may include a domain name and may be published on a web server. The merchant website 105 may be configured to be accessed by the customer via a network, such as the Internet (e.g., via the Internet Protocol Network), a local or wide area network, and/or any other network that allows the customer to access the merchant website and buy/sell goods/services therefrom. In some embodiments, the customer may access the merchant website 105 by entering a uniform resource locator ("URL") of the merchant website into a web browser of the computing device 107 and by establishing a Hypertext Transfer Protocol ("HTTP") communication with the merchant website. In other embodiments, the customer may access the merchant website 105 in other ways. The computing device 107 on which the merchant website 105 is displayed may be any of a variety of computing devices, such as a computer (e.g., desktop, laptop, etc.), a tablet, personal digital assistant, mobile phone, smart watch or other device configured to access and display the merchant device on a user interface thereof.

The merchant website 105 is associated with the data collection system 110. In some embodiments, the data collection system 110 may be embedded within the merchant website 105. In other embodiments, the data collection system 110 may be separately installed and associated with the merchant website 105. For example, in some embodiments, the data collection system 110 may be configured as a browser extension, add-on service, or other type of software application, software development kit ("SDK"), or other web toolkit, which may be downloaded and installed (e.g., from a web store of the web browser on which the merchant website 105 is accessed) for collecting data. In other embodiments, the data collection system 110 may be made available to the customer for associating with the merchant website 105 in other ways. Upon downloading and installing the data collection system 110, the data collection system may appear as a widget or other type of icon on the merchant website 105 or the web browser on which the merchant website is displayed.

The data collection system 110 is configured to gather a variety of data. Generally speaking, the data that is gathered by the data collection system 110 may be divided into two broad categories: device data 140 and contextual data 145. Device data 140 is data associated with the computing device 107. The device data 140 may include information such as the unique serial identifier of the computing device 107, the computing platform (e.g., Windows, Mackintosh, etc.) of the computing device, model and make of the computing device, Internet Protocol ("IP") address of the browser on which the merchant website 105 is accessed, other installed browsers on the computing device, the geo-location of the computing device, information for determining whether the computer device has been jailbroken (e.g., hacked, stolen, etc.), security and encryption features (e.g., tor network, virus scan, proxy networks, etc.) on the computing device, metadata, connection networks, etc. Generally speaking, the device data 140 may include any hardware, software, and/or firmware data related to the computing device 107 that may be needed or considered desirable to have in determining whether the computing device is a trustworthy device. As used herein, the computing device 107 is "trustworthy" if the computing device is not a stolen device, has not been compromised in any other way, and has not been used for making fraudulent transactions in the past.

Contextual data 145 is data associated with the customer. For example, the contextual data 145 may include customer name, billing address, shipping address, payment instruments and payment information associated with those payment instruments, whether the customer has previously made fraudulent transactions, browsing history of the customer, shopping history of the customer, including names and websites of merchants, goods/services (e.g., product names, SKUs, etc.) bought/sold by the customer, usernames, passwords, amounts of current and previous transactions, transaction types, sales channels, customer demographic information, and any other customer related information that may be needed or considered desirable to have in determining whether the customer is a trustworthy customer. The customer is "trustworthy" if the customer has not made fraudulent transactions in the past and if the payment instrument used by the customer in a transaction is not a stolen or invalid payment instrument and has not been used in the past for making fraudulent transactions.

The payment instrument may be any payment card, account, object, file, or database with which a currency is attached and from which the customer is able to transfer funds to another entity. Example payment instruments may include credit cards, debit cards, gift cards, other types of transaction cards, bank accounts, (e.g., checking accounts, savings account, and other demand deposit accounts), flexible spending accounts, individual retirement accounts, health savings accounts, investment accounts, other types of money accounts, financial rewards (e.g., cash back, rewards points, and the like), etc. The payment instrument may be associated with (e.g., issued by) a provider institution, such as a bank. The provider institution may thus include commercial or private banks, credit unions, investment brokerages, wallet providers, or any commercial entity capable of maintaining payment instruments on behalf of the customer.

Thus, the data collection system 110 gathers a variety of data. In some embodiments, the data collection system 110 is configured to run in the background. Also in some embodiments, the data collection system 110 is configured to be activated when the customer is on the merchant website 105 (e.g., when the URL of the merchant website is entered into the browser) and/or when the customer starts a checkout process for completing a transaction on the merchant website. In other embodiments, the data collection system 110 may be configured to be activated each time the customer is using the computing device 107 (e.g., regardless of whether the customer is browsing the merchant website 105 or not). When activated, the data collection system 110 gathers data, and sends at least a portion of the collected data to the authentication system 120.

In some embodiments, upon activation, the data collection system 110 may continuously monitor for new data to become available and as soon as the new data becomes available, the data collection system may collect that data. In other embodiments, the data collection system 110 may be programmed to periodically gather any new data that may have become available since the last data gathering. Further, in some embodiments, the data collection system 110 may be configured to instantaneously or substantially simultaneously transmit the gathered data to the authentication system 120. In other embodiments, the data collection system 110 may transmit the data to the authentication system 120 periodically. Thus, the data collection system 110 may be configured in a variety of ways to gather data, and transmit that data to the authentication system 120 via the network 115A.

In some embodiments, the data collection system 110 may be configured to communicate with the authentication system 120 via an application programming interface ("API"). Using the API, the data collection system 110 may send the gathered data to the authentication system 120 and receive information back from the authentication system. In some embodiments, the API may be a representational state transfer ("REST") type of API. In other embodiments, the API may be any other type of web or other type of API (e.g., ASP.NET) built using any of a variety of technologies, such as Java, .Net, etc., that is capable of accessing the authentication system 120 and facilitating communication between the data collection system and the authentication system. In some embodiments, the API may be configured to facilitate communication with the authentication system 120 via a hypertext transfer protocol ("HTTP") or hypertext transfer protocol secure ("HTTPS") type request. The API may receive an HTTP/HTTPS request and send an HTTP/HTTPS response back. In other embodiments, the API may be configured to facilitate communication with the authentication system 120 using other or additional types of communication protocols. In some embodiments, the data collection system 110 may be configured as a software agent of the authentication system.

The authentication system 120 is configured to receive the data from the data collection system 110 and store the data within a memory 150 associated with the authentication system. The memory 150 may be any of a variety of storage devices including volatile and non-volatile memory devices. For example, the memory 150 may be a flash memory, magnetic storage device (e.g., hard disk, floppy disk, magnetic strips, etc.), optical disk (e.g., compact disk, digital versatile disk, etc.), smart cards, solid state devices, cloud storage, and other types of storage devices that are suitable for use as the memory 150. The data received from the data collection system 110 is used by the pre-transaction system 125 and the post-transaction system 130.

The pre-transaction system 125 analyzes the data to identify a fraudulent transaction before the transaction is completed, and tailor the customer's checkout experience during the transaction based on the analysis. Thus, the pre-transaction system 125 includes a customer score system 155 to compute a customer score, a device score system 160 to compute a device score, and a payment score system 165 to compute a payment score. The pre-transaction system 125 also includes an overall score system 170 that combines the customer score, the device score, and the payment score to compute an overall score to determine whether a transaction is fraudulent. Based on the overall score computed by the overall score system 170, a customer experience system 175 of the pre-transaction system 125 tailors the customer experience of the customer on the merchant website 105 during the underlying transaction.

Although the customer score system 155, the device score system 160, the payment score system 165, the overall score system 170, and the customer experience system 175 are shown as separate components, in at least some embodiments, one or more of those components may be combined together, and the combined component may perform the functions of the individually combined components. Similarly, although not shown, one or more of the customer score system 155, the device score system 160, the payment score system 165, the overall score system 170, and the customer experience system 175 may have associated therewith a processing unit, memory, network interfaces, and other hardware, firmware, and software components that are needed or considered desirable for those components to have in performing their respective functions, as described herein.

The post-transaction system 130 receives data from the pre-transaction system 125, the data collection system 110, and data from the third party systems 135 to compute a fraud threshold that is used by the pre-transaction system for identifying a fraudulent transaction. The post-transaction system 130 continuously refines and updates the fraud threshold to further improve the accuracy of detecting a fraudulent transaction. Although not shown, the post-transaction system 130 may have associated therewith a processing unit, memory, network interfaces, and other hardware, firmware, and software components that may be needed or considered desirable for the post-transaction system to have in performing its functions, as described herein. Further, although the pre-transaction system 125 and the post-transaction system 130 are shown as separate components, in at least some embodiments, those components may be combined together into a single component and the single component may perform the functions of the individual components.

The authentication system 120 also includes a processing unit 180 that is configured to execute instructions for implementing the pre-transaction system 125, the post-transaction system 130, and the other functionalities of the authentication system. As discussed above, in some embodiments, each of the pre-transaction system 125 and the post-transaction system 130 may have their own separate instance of the processing unit 180. The processing unit 180 may be implemented in hardware, firmware, software, or any combination thereof. "Executing an instruction" means that the processing unit 180 performs the operations called for by that instruction. The processing unit 180 may retrieve a set of instructions from a memory for execution. For example, in some embodiments, the processing unit 180 may retrieve the instructions from a non-volatile memory device and copy the instructions in an executable form to a volatile memory device that is generally some form of random access memory (RAM). The non-volatile and volatile memory devices may both be part of the memory 150, or may be separate from the memory 150. In some embodiments, the processing unit 180 may be configured to execute the instructions within the non-volatile memory device itself without having to first copy those instructions to the volatile memory device.

Further, in some embodiments, the processing unit 180 may be a special purpose computer, and include logic circuits, hardware circuits, etc. to carry out the instructions retrieved from the memory (e.g., the memory 150). The processing unit 180 may include a single stand-alone processing unit, or a plurality of processing units that use the same or different processing technology. The instructions may be written using one or more programming language, scripting language, assembly language, etc.

Additionally, in some embodiments, the authentication system 120 may be installed on a server and/or may be hosted on a cloud service and accessed via the cloud. In some embodiments, the authentication system 120 may additionally or alternatively be configured as a mobile application that is suitable for installing on and access from a mobile computing device (e.g., a mobile phone). Further, the authentication system 120 may be accessed (e.g., by the data collection system 110 and the third party systems 135) in a variety of ways such as via an API or other mechanisms.

The authentication system 120 may also provide a user interface to facilitate human-computer interaction between authorized personnel of the decision making system 100 and the authentication system. Thus, the authentication system 120 may be configured to receive user inputs from the authorized personnel via a graphical user interface ("GUI") of the authentication system. The authentication system 120 may also be configured to present a variety of information to the authorized personnel via the GUI. The GUI may present a variety of graphical icons, visual indicators, menus, visual widgets, and other indicia to facilitate user interaction. In other embodiments, the authentication system 120 may be configured as other types of user interfaces, including for example, text-based user interfaces and other man-machine interfaces. Thus, the authentication system 120 may be configured in a variety of ways.

The authentication system 120 may be configured to receive the user inputs in a variety of ways. For example, the authentication system 120 may be configured or associated with input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the authorized personnel, to enter information into the authentication system. The authentication system 120 may also be configured to present outputs/information to the user in a variety of ways to external systems such as the authorized personnel, memory, printers, speakers, etc.

Therefore, although not shown, the authentication system 120 may be associated with a variety of hardware, software, firmware components, or combinations thereof. Generally speaking, the authentication system 120 may be associated with any type of hardware, software, and/or firmware component that enables the decision making system 100 to perform the functions described herein.

Referring still to FIG. 1, the third party systems 135 may include a variety of trusted third party fraud detection platforms. The authentication system 120 may communicate with the third party systems 135 to receive additional information and/or to confirm the validity of data gathered by the data collection system 110. For example, the third party systems 135 includes a device network 185 that enables the authentication system 120 to establish the trustworthiness of the computing device 107, a provider network 190 that establishes the trustworthiness of the customer and the payment instrument used by the customer during a transaction, and other networks 195 to provide additional information used by the pre-transaction system 125 and the post-transaction system 130 of the authentication system 120.

The networks 115A and 115B that facilitate communication between the data collection system 110 and the authentication system 120, and between the authentication system and the third party systems 135 may include any of a variety of wired or wireless network channels that may be suitable for use within the decision making system 100. For example, in some embodiments, either or both of the networks 115A and 115B may include wired connections, such as an Ethernet connection, one or more twisted pair wires, coaxial cables, fiber optic cables, etc. In other embodiments, either or both of the networks 115A and 115B may include wireless connections, such as microwaves, infrared waves, radio waves, spread spectrum technologies, satellites, near-field communication, Bluetooth®, laser-based data transmitters, etc. The networks 115A and 115B may also be configured to communicate with another device using cellular networks, local area networks, wide area networks, the Internet, etc. In some embodiments, the networks 115A and 115B may include a combination of wired and wireless communications. Although not shown, either or both of the networks 115A and 115B may include various routers, switches, network adapters, network interfaces, and other components that enables communication between the data collection system 110 and the authentication system 120, and between the authentication system and the third party systems 135.

Figure 2:
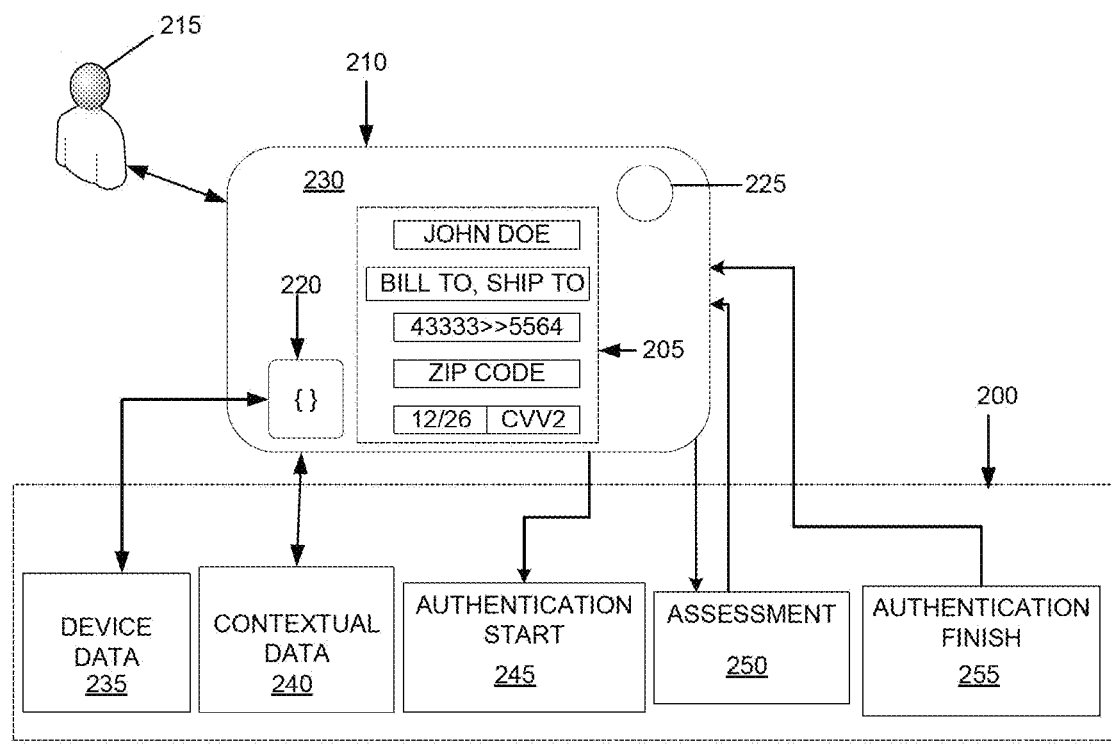
FIG. 2 is an example flow diagram of a pre-transaction system of the decision making system in greater detail, in accordance with some embodiments of the present disclosure.

Turning now to FIG. 2, an example flow diagram of a pre-transaction system 200 is shown, in accordance with some embodiments of the present disclosure. The pre-transaction system 200 is similar to the pre-transaction system 125. Thus, the pre-transaction system 200 is configured to detect whether a current transaction 205 on a merchant website 210 by a customer 215 is fraudulent before the transaction is completed. The pre-transaction system 200 is also configured to define the checkout experience of the customer 215 during the current transaction 205 based on the determination whether the current transaction is fraudulent. As used herein, a "current transaction" means a transaction that is currently underway to buy/sell goods/services from the merchant website 210 on a computing device 220, and that activates the pre-transaction system 200. Specifically, in some embodiments, the pre-transaction system 200 is configured to be activated when the pre-transaction system receives data from a data collection system 225 and when the customer 215 starts a checkout process. As used herein, "checkout," "checkout process," or other like terms mean performing one or more actions (e.g., by clicking on a "cart" or equivalent button/icon) by the customer 215 to access a checkout page 230 on the merchant website 210 to complete the current transaction 205. In other embodiments, the pre-transaction system 200 may be configured to be activated upon satisfaction of other or different conditions. "Completing" the current transaction 205 means that the customer 215 has either successfully placed an order on the merchant website 210 (e.g., received confirmation that the order has been placed) or the transaction has been denied (e.g., not approved).

As used herein, a "checkout page" means a web page of the merchant website 210 where the customer 215 enters the payment information, the shipping or billing address, views the "shopping cart," reviews the transaction, places the order, enters contact information, creates an account, or any combination thereof. The checkout page 230 may be configured in a single-page checkout format or in a multi-page checkout format. The checkout page 230 may be accessed by clicking a "checkout," "cart," or other similar button/icon on the merchant website 210.

Upon detecting the start of the checkout process, the data collection system 225 gathers data from the merchant website 210 and transmits that data to the pre-transaction system 200. Specifically, as the customer 215 starts the checkout process, the data collection system 225 gathers device data 235 from the computing device 220 and contextual data 240 from the merchant website 210, and transmits that data to the pre-transaction system 200. As the customer enters additional information on the checkout page 230, the data collection system 225 collects the additional information and transmits that additional information to the pre-transaction system 200. Upon receiving the device data 235 and the contextual data 240, the pre-transaction system 200 begins an authentication process 245 to authenticate the computing device 220, authenticate the customer 215, and authenticate the payment instrument (e.g., credit card information) whose information is entered on the checkout page 230 to pay for the current transaction 205. The pre-transaction system 200 may connect to a plurality of trusted third party networks (e.g., the third party systems 135) to receive a variety of information, including historical information about the computing device 220, the customer 215, and the payment instrument entered during checkout.

Based on the information received from such third party networks, the pre-transaction system 200 establishes the trustworthiness of the computing device 220, the customer 215, and the payment instrument. In other words, the pre-transaction system 200 authenticates the computing device 220, the customer 215, and the payment instrument by assigning a device score, customer score, and payment score, respectively. The pre-transaction system 200 computes an overall score by combining the device score, the customer score, and the payment score to perform an assessment 250 of whether the current transaction 205 is a fraudulent transaction. Based upon the results of the assessment 250, the pre-transaction system 200 makes one or more decisions as part of a complete authentication process 255.

Specifically, if the pre-transaction system 200 determines that the results of the assessment 250 indicate that the current transaction 205 is fraudulent, the pre-transaction system may implement additional security protocols pursuant to which the pre-transaction system may request additional information from the customer 215 to either confirm that the current transaction is indeed fraudulent and ultimately deny the current transaction or to determine that the current transaction is not fraudulent and allow the current transaction to go through. The authentication process 245, the assessment 250, and the complete authentication process 255 are discussed in greater detail with respect to FIGS. 3 and 4 below.

As part of the complete authentication process 255 and after the transaction has completed, the pre-transaction system 200 also gathers data related to the current transaction 205 for use by the post-transaction system 130. For example, the pre-transaction system 200 may gather information such as whether the current transaction 205 was found fraudulent, whether the current transaction completed successfully, whether the current transaction was denied, whether any issues were encountered with the payment instrument, and any other information that the post-transaction system 130 may need to adjust the accuracy of fraud detection.

Figure 3:
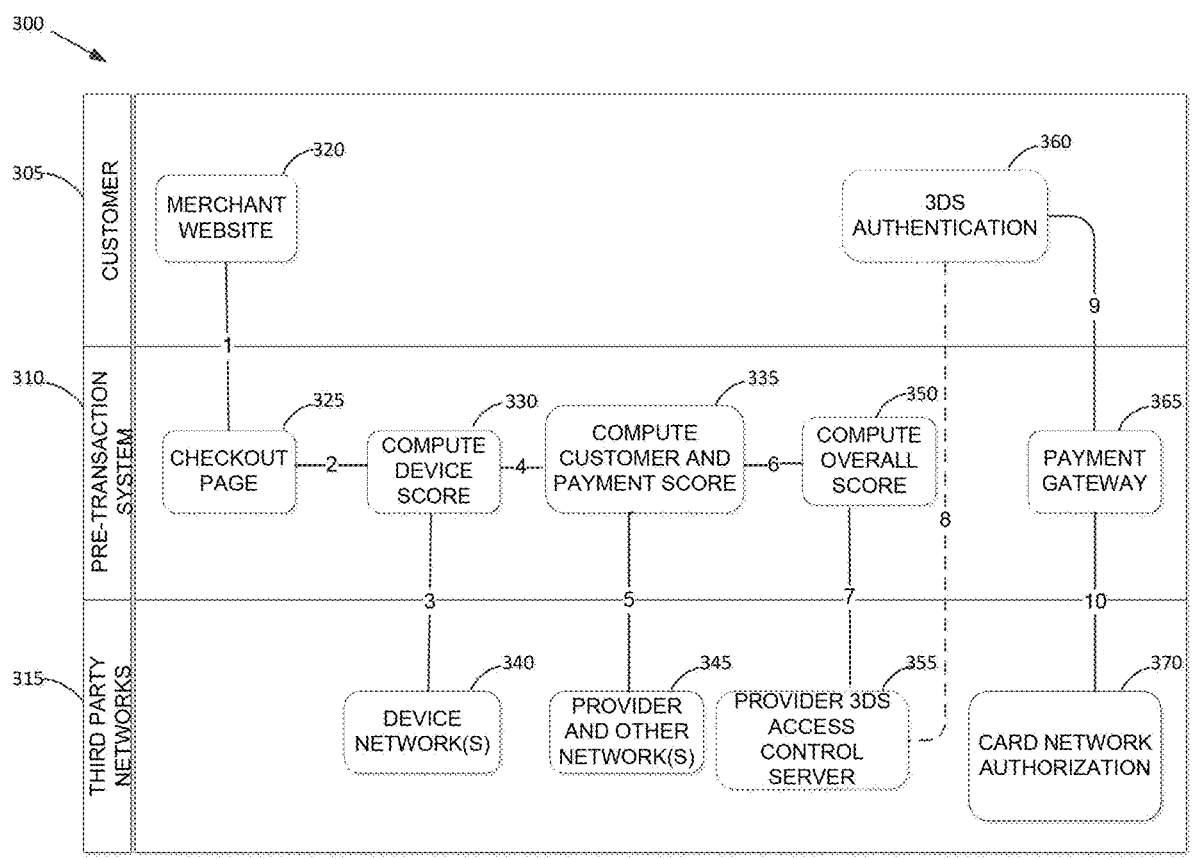
FIG. 3 is another example flow diagram of the pre-transaction system, in accordance with some embodiments of the present disclosure.

Referring now to FIG. 3, an example flow diagram outlining a process 300 for identifying a fraudulent transaction is shown, in accordance with some embodiments of the present disclosure. Additional, fewer, or different operations may be performed in process 300 depending on the implementation. The process 300 involves interaction between at least three distinct entities: a customer 305, a pre-transaction system 310 of an authentication system, and third party networks 315. The process 300 begins with the customer 305 accessing a merchant website 320 on a computing device. The merchant website 320 is associated with a data collection system (e.g., the data collection system 110). When the customer 305 is ready to complete the current transaction, the customer accesses a checkout page 325 on the merchant website 320, which activates the pre-transaction system 310. The pre-transaction system 310 receives device data pertaining to the computing device on which the merchant website 320 is displayed and contextual data pertaining to the customer 305 from the data collection system. The pre-transaction system 310 computes a device score 330, as well as a customer score and a payment score. The customer score and payment score are combined together in FIG. 3 and referenced by a customer and payment score 335. In some embodiments, a single customer score combining the customer score and the payment score may be computed. In other embodiments, two separate scores: one for the customer score and one for the payment score may be computed.

Upon receiving the device data and contextual data, the pre-transaction system 310 establishes contact with one or more of the third party networks 315 to authenticate the computing device, authenticate the customer 305, and authenticate the payment instrument being used to complete the current transaction. For example, the pre-transaction system 310 establishes communication with a device network 340 to authenticate the computing device on which the customer 305 has accessed the merchant website 320 during the current transaction. The pre-transaction system 310 may send at least some of the received device data and/or contextual data to the device network 340. For example, the pre-transaction system 310 may send the identity of the computing device and the identity of the customer 305 to the device network 340. Based on the information received from the pre-transaction system 310, the device network 340 may send a device profile back to the pre-transaction system. The device profile may include information such as the identity of the customer (e.g., the customer 305) with which the computing device has previously been associated, whether the computing device has previously been used to make fraudulent purchases, how far is the computing device from other computing devices (e.g., mobile phone) associated with the customer 305, whether the computing device is a public device (e.g., a library laptop) or a privately owned device, which payment mechanisms (e.g., credit cards, bank accounts, etc.) are associated with the computing device, whether the computing device has been jailbroken or hacked in the past, and any other information related to the various hardware, software, and/or firmware components of the computing device that the pre-transaction system 310 may need or consider desirable to have in computing the device score 330 and authenticating the computing device to establish the computing device's trustworthiness.

In some embodiments, the pre-transaction system 310 may specifically request for certain types of information related to the computing device from the device network 340 to be included in the device profile. In other embodiments, the pre-transaction system 310 may simply request a device profile and the device network 340 may provide a default device profile. Further, in some embodiments, the pre-transaction system 310 may request a device profile from a single device network, while in other embodiments, the pre-transaction system may request a device profile from multiple device networks, which the pre-transaction system may then aggregate to determine the device score 330.

Similarly, the pre-transaction system 310 computes the customer and payment score 335. The pre-transaction system 310 may send at least a portion of the device data and/or contextual data to one or more networks 345 for authentication. The networks 345 may include, for example, a background check system, a card network directory server, an access control server, and/or other networks associated with the provider institution of the customer 305 to authenticate the customer 305 and the payment instrument (e.g., credit card) being used by the customer during the current transaction. The networks 345 may also include a Lexis Nexis network and/or other background check networks to determine whether the customer 305 is a fraudulent individual, credit card networks such as the Fair Isaac Corporation (FICO) to identify credit risk, and/or other fraud detection platforms. The pre-transaction system 310 may receive a customer profile and a payment profile from each of the network(s) 345.

As an example, the customer profile may include information such as demographic information of the customer 305 (e.g., does the customer name match the name from other transactions completed on this computing device in the past), transaction history of the customer from the merchant website 320 (e.g., has the customer placed orders before from the merchant website, has the customer bought the products being currently bought before, is the order amount significantly different from past orders, has the customer conducted fraud before, etc.), customer's contact information (e.g., does the customer's contact information match previously provided contact information), and any other information that may be needed or considered useful for the pre-transaction system to have in determining whether the customer is who the customer is saying they are. Payment profile may include information related to the payment instrument being used to pay for the order and complete the transaction. For example, the payment profile may identify whether the payment instrument is stolen, whether the payment instrument is still valid, and any other information to determine that the payment instrument is valid.

Although the process 300 has been shown as computing the device score 330 before the customer and payment score 335, it is to be understood that the customer score and payment score may be computed before the device score, or the various scores may be computed simultaneously or substantially simultaneously. The pre-transaction system 310 may compute the device score 330 based on the device profile, the customer score based on the customer profile, and the payment score based on the payment profile. The pre-transaction system 310 combines the device score, the customer score, and the payment score into an overall score 350.

Based upon the overall score, the pre-transaction system 310 may determine that the current transaction is not fraudulent and allow the current transaction to be completed. If the pre-transaction system 310 determines based on the overall score that the current transaction is likely fraudulent, the pre-transaction system may initiate additional security protocols. For example, in some embodiments, the pre-transaction system 310 may implement a 3D-secure ("3DS") mechanism for the additional security protocols. In other embodiments, the pre-transaction system 310 may implement other or additional security protocols. Under the 3DS protocol, the pre-transaction system 310 communicates with an access control server 355 of the provider institution of the customer 305 to further authenticate the computing device, the customer 305, and the payment instrument. The access control server 355 may provide a unique code to the customer 305 and ask the customer to enter that code in a 3DS authentication step 360 on the merchant website 320. If the code entered during the 3DS authentication step matches the code sent by the access control server 355, the pre-transaction system 310 allows the transaction to complete. To complete the transaction, the pre-transaction system 310 sends the payment information via gateway 365 to an acquirer payment network 370 of the merchant.

If the code entered during the 3DS authentication step does not match the code sent by the access control server 355, the pre-transaction system 310 may request the customer to use alternate forms of payments that are considered more secure to complete the transaction or ultimately deny the transaction.

Figure 4:
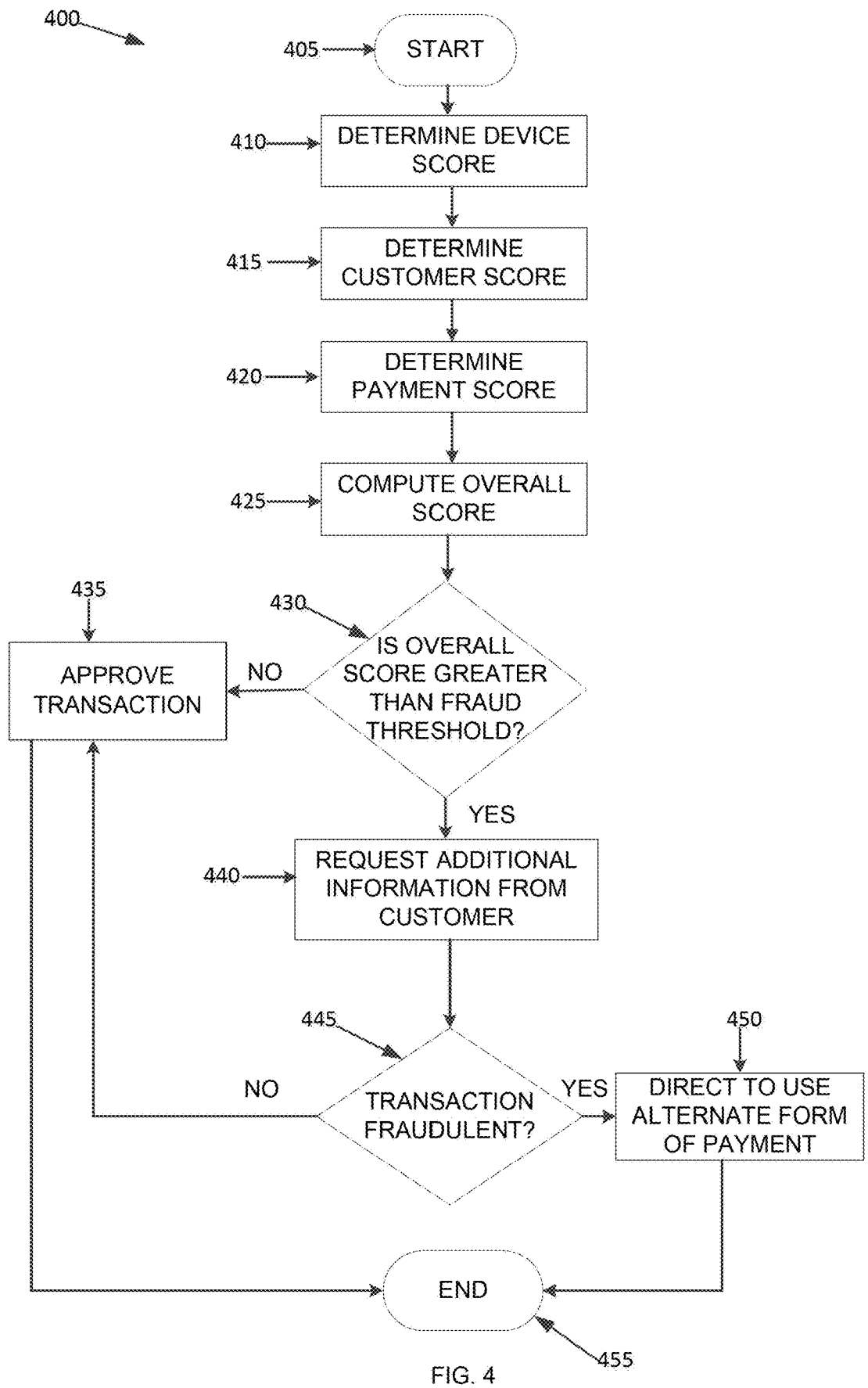
FIG. 4 is an example flowchart outlining operations of the pre-transaction system, in accordance with some embodiments of the present disclosure.

Turning now to FIG. 4, an example flowchart outlining operations of a process 400 are shown, in accordance with some embodiments of the present disclosure. The process 400 may include additional, fewer, or different operations, depending on the particular embodiment. The process 400 is discussed in conjunction with FIG. 1. The process 400 is implemented by the pre-transaction system 125 of the authentication system 120. The process 400 starts at operation 405 with the pre-transaction system 125 receiving data from the data collection system 110 and the customer starting a checkout process to buy/sell goods/services on a merchant website. Upon receiving data from the data collection system 110, the pre-transaction system 125 starts an authentication process to authenticate the computing device that the customer is using to access the merchant website, as well as authenticate the customer and the payment instrument used by the customer to pay for the goods/services.

Thus, at operation 410, the pre-transaction system 125 computes a device score for the computing device. The device score may be based on heuristics within the computing device, and particularly, based upon the hardware, software, and/or firmware components of the computing device. In some embodiments, the hardware, software, and/or firmware components may be categorized and weighted by the pre-transaction system 125 based on various factors indicative of fraudulent activity. A device intelligence computer model of the pre-transaction system 125 may combine the various weighted hardware, software, and/or firmware components to compute the device score. Thus, upon receiving device data pertaining to the computing device from the data collection system 110, the pre-transaction system may establish communication with one or more device networks (e.g., the device network 185). In some embodiments, the pre-transaction system 125 may make a look-up call to the device network asking for a device profile of the computing device.

Upon receiving the device profile from the device network, the pre-transaction system 125 determines whether the computing device is a trustworthy device. Specifically, the pre-transaction system 125 may analyze the information in the device profile and assign weights to the various hardware, software, and/or firmware components of the computing device based on one or more factors. For example, if the device profile indicates that the computing device is a stolen device (e.g., has been hacked or jailbroken), the pre-transaction system 125 may determine that the likelihood of making fraudulent transactions from the computing device is higher. Thus, the pre-transaction system 125 may assign higher weights to the hardware, software, and/or firmware components that indicate that the computing device is a stolen device. Similarly, if the pre-transaction system 125 determines from the device profile that the device has been previously used to make fraudulent transactions, the pre-transaction system may determine that the likelihood of using the computing device for making fraudulent transactions again is higher, and assign higher weights to those hardware, software, and/or firmware components that are indicative of the previous fraudulent activity.

The pre-transaction system 125 may also compare the IP address of the computing device with the address to which the goods/services being bought/sold on the merchant website are being shipped to. The pre-transaction system 125 may also compare the IP address to IP addresses associated with the computing device in the previous transactions. If the IP addresses do not match, the pre-transaction system 125 may look at additional information within the contextual data and device data to confirm whether the computing device is trustworthy. For example, the pre-transaction system 125 may compare the location (e.g., from the IP address) of the computing device to the location of other devices such as a mobile phone associated with the customer. Since the customer's mobile phone is likely to be with the customer, if the location of the computing device does not match the location of the mobile phone and/or does not match previously stored locations of the mobile phone, the pre-transaction system 125 may determine that the computing device has been compromised. The pre-transaction system 125 may perform other or additional checks (and assign weights accordingly) to determine the trustworthiness of the computing device for authenticating the computing device.

On the other hand, if the pre-transaction system 125 determines from the device profile that the computing device is a privately owned, non-stolen device that has not made fraudulent purchases in the past, the pre-transaction system may determine that the computing device is likely trustworthy. Thus, the pre-transaction system 125 may assign weights to one or more of the hardware, software, and/or firmware components of the computing device, and then aggregate the various weights to obtain the device score. The aggregation of the individual weights may be based upon computer modeling, applying a mathematical function (e.g., average), etc.

A high device score may indicate that the computing device is authenticated, and therefore, trustworthy (e.g., not compromised). A low device score may indicate that the computing device is not authenticated, and therefore, not trustworthy and is likely to make a fraudulent transaction. In some embodiments, the device score may be in between a high scorer and a low score when the pre-transaction system 125 cannot confirm with substantial certainty whether the computing device is trustworthy or not. In other embodiments, the pre-transaction system 125 may be configured to assign only a high score or a low score, and may assign a low score if the trustworthiness cannot be established with substantial certainty. The format of the score may vary from one embodiment to another. In some embodiments, the score may be a number. In other embodiments, the score may simply be a word, such as "high," "low" or other like terms. In yet other embodiments, the score may be other types of numerical characters, alphabetic characters, alphanumerical characters, special characters, or any combinations thereof.

Similarly, at operations 415 and 420, the pre-transaction system 125 determines a customer score and a payment score, respectively. Again, the pre-transaction system 125 may contact one or more networks (e.g., the provider network 190, the other networks 195) to authenticate the customer and the payment instrument. The pre-transaction system 125 may receive a customer profile and a payment profile back from the various networks. Based on the customer profile and the payment profile, the pre-transaction system 125 may determine whether the customer has made fraudulent transactions before, whether the customer's provider institution recognizes the customer, whether the payment instrument is associated with the customer, and so on. If the pre-transaction system 125 determines that the customer is trustworthy, the pre-transaction system authenticates the customer and assigns the customer a high customer score. Additionally, if the pre-transaction system 125 determines that payment instrument is valid/not-stolen and does not raise any red flags, the pre-transaction system authenticates the payment instrument and assigns the payment instrument a high payment score. The format of the customer score and the payment score is same as the format of the device score. In some embodiments, the operations 415 and 420 may be combined into a single operation in which a single customer and payment score may be computed.

Thus, the customer score may be based upon the result of the information submitted on the payment page during a checkout process discussed below. By analyzing the payment information, billing information, shipping information, email address, products being purchased, merchant seller, velocity across the network, prior fraudulent transaction history, etc., the pre-transaction system 125 may use artificial intelligence and machine learning modeling to produce the customer score based on weighted customer data points, similar to the device score. The payment score may use similar modeling techniques to produce a weighted risk average for the payment instrument. In some embodiments, the customer score and payment score may be combined together and a single score may be produced.

At operation 425, the pre-transaction system 125 combines the device score, the customer score, and the payment score into an overall score. In some embodiments, the pre-transaction system 125 may compute an average of the device score, the customer score, and the payment score to compute the overall score. In other embodiments, the pre-transaction system 125 may assign weights to each of the device score, the customer score, and the payment score, and compute the overall score based on the weights. In yet other embodiments, the pre-transaction system 125 may use other mechanisms to combine the device score, the customer score, and the payment score. Additionally, to determine if the current transaction is fraudulent, the pre-transaction system 125 compares the overall score to a fraud threshold at operation 430. The fraud threshold is a computed threshold by the post-transaction system 130 that is continuously refined based on historical data.

If the pre-transaction system 125 determines that the overall score is less than the fraud threshold, the pre-transaction system concludes that the current transaction is likely not fraudulent and allow the transaction to go through at operation 435. On the other hand, if the pre-transaction system 125 determines that the overall score is greater than the fraud threshold, the pre-transaction system may initiate additional security protocols. Thus, the pre-transaction system 125 may request additional information from the customer at operation 440 to rule out the possibility of a fraudulent transaction or to confirm that the transaction is indeed fraudulent. Specifically, in some embodiments, the pre-transaction system 125 may initiate a 3DS protocol with the customer's provider institution to authenticate the current transaction. By using the 3DS protocol, the customer's provider institution may generate and send a one-time password or code to a device registered by the customer with the provider institution. The customer may be asked to enter the password or code within a designated field during the checkout process to authenticate the customer, payment instrument, and/or the computing device.

Upon entering the code, at operation 445, the pre-transaction system 125 determines whether the entered password or code matches the password or code that was sent by the provider institution to the customer. If a match is found, the pre-transaction system 125 determines that the current transaction is likely not fraudulent and allows the transaction to complete at the operation 435. On the other hand, if the customer fails to enter the password or code, or if the entered password or code does not match the password or code sent to the customer, the pre-transaction system 125 may determine that the likelihood of the current transaction being fraudulent is high. Thus, at operation 450, the pre-transaction system 125 may direct the customer to use a different form of payment to mitigate the risk of a fraudulent transaction. If the customer successfully enters another form of payment, the pre-transaction system 125 allows the transaction to go through. If not, the pre-transaction system 125 denies the transaction and the process 400 ends at operation 455.

Figure 5A:
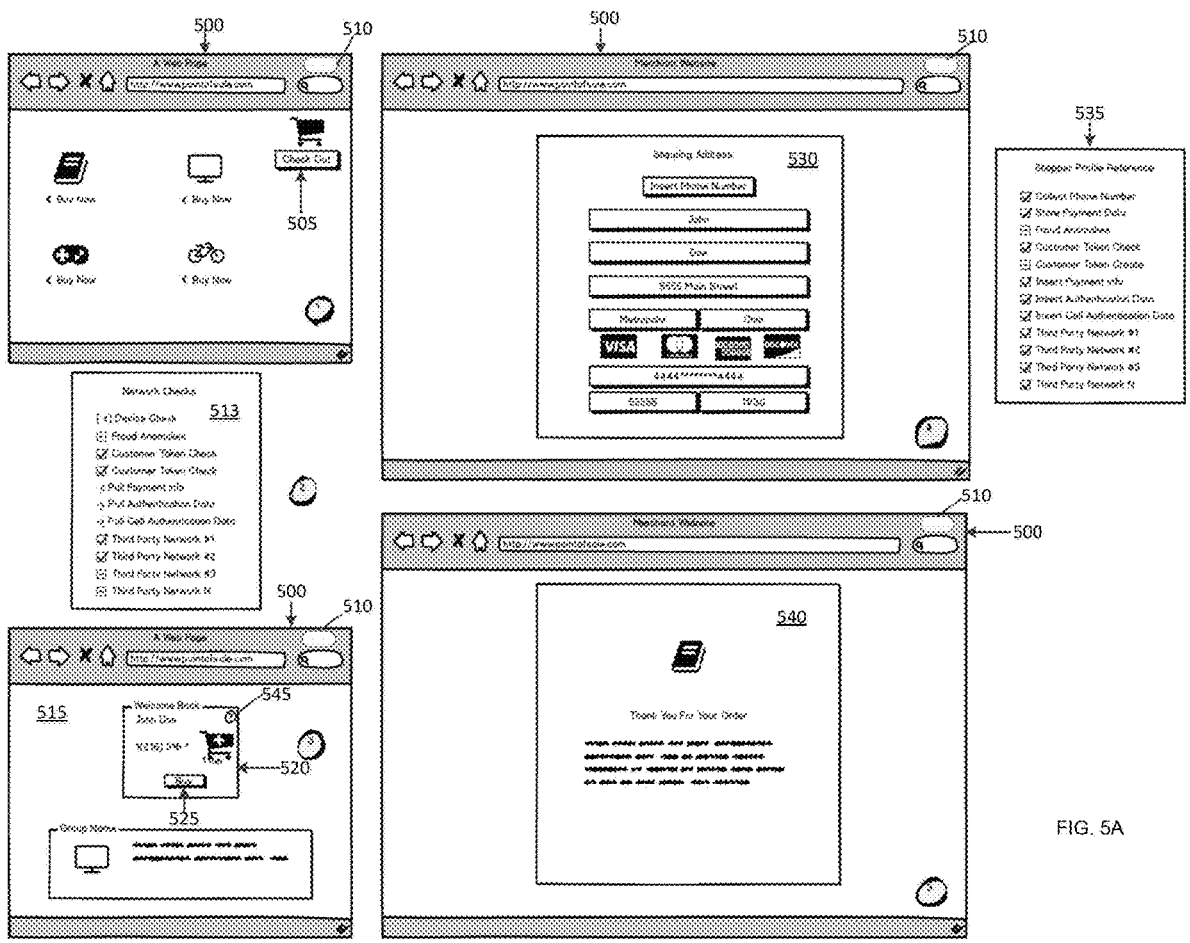
FIGS. 5A-5C are example user interfaces showing a customer's interaction with the pre-transaction system, in accordance with some embodiments of the present disclosure.
Figure 5B:
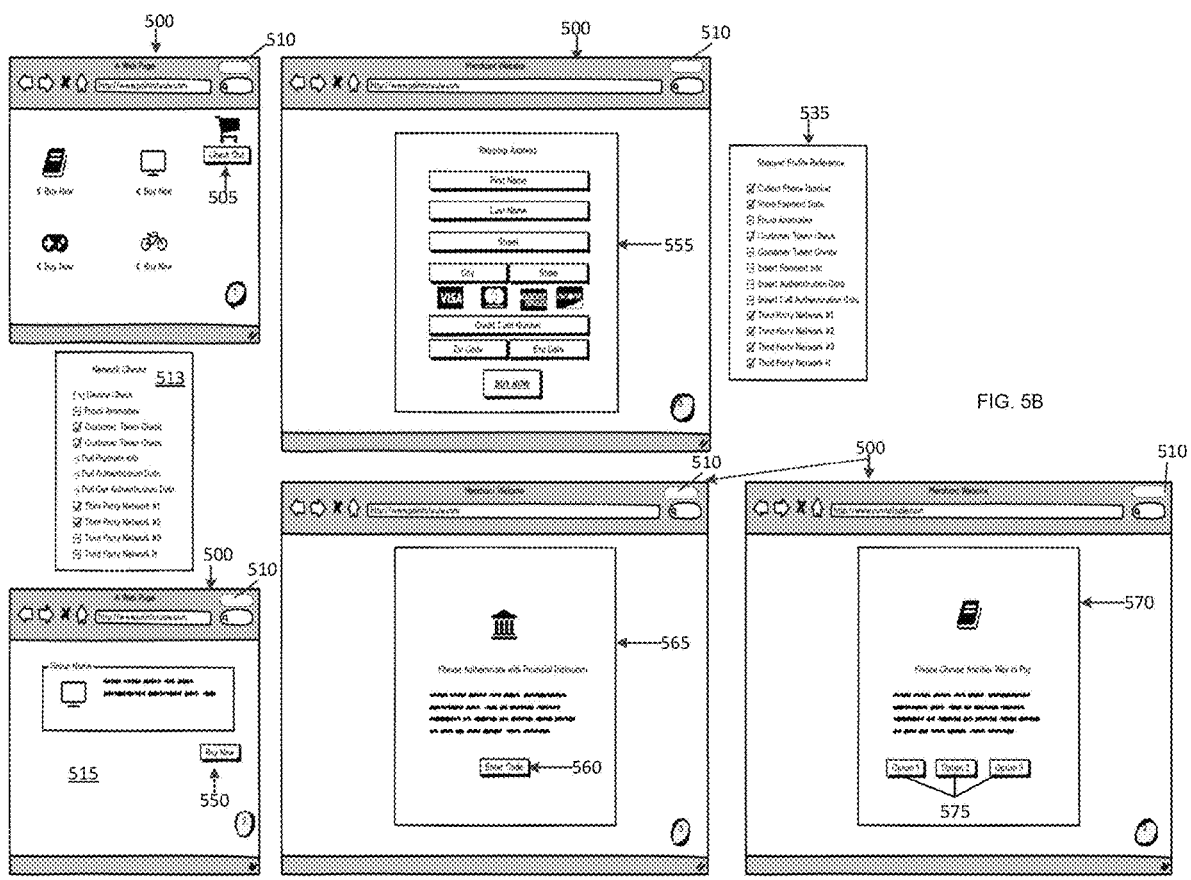
Figure 5C:
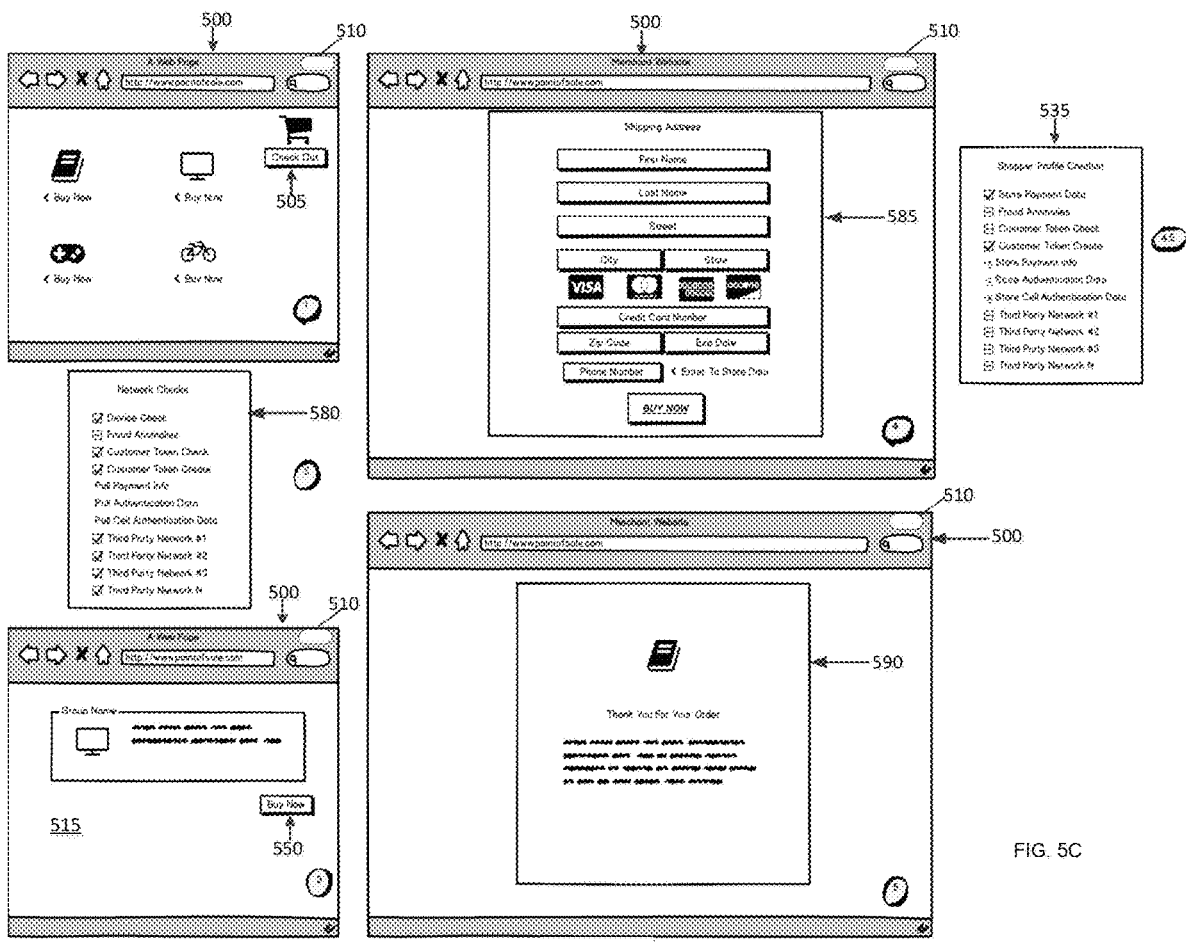

Turning to FIGS. 5A-5C, example user interfaces depicting how an example checkout process may appear to a customer are shown, in accordance with some embodiments of the present disclosure. The pre-transaction system 125 may classify customers into two types: new customer or returning customer. As used herein, a "returning customer" means a customer who has transacted on a merchant website in the past, either using the same computing device as the one being used in a current transaction or using a different computing device. For a returning customer, the pre-transaction system 125 may have a variety of customer information saved from the prior transactions. The pre-transaction system 125 may associate such customer information with a customer profile (also referred to herein as a "behavioral analytics" profile) and create a customer token representing a mathematical representation of the customer. The customer token encrypts and stores the customer's payment information (and possibly other customer information) in an easily accessible database. Example information that may be saved as part of the customer profile and/or customer token may include customer name, customer shipping address, customer billing address, customer phone number, payment information of one or more payment instruments, etc. For a new customer, the pre-transaction system 125 may not have a customer token associated with the customer. After the first transaction by the new customer, the pre-transaction system 125 may create a customer token for the customer for future transactions on the merchant website.

The customer token may assume a variety of formats. In some embodiments, the customer token may assume a voltage token format in which the customer token is based upon a payment instrument of a customer. For example, in some embodiments and when the payment instrument is a payment card (e.g., credit card) having a card number (e.g., credit card number), the customer token may be a numeric value generated by preserving certain digits (e.g., the first and last four digits) of the card number and appending and/or interweaving other machine generated or other numbers to the certain digits of the card number. In some embodiments, the customer number may be a sixteen-nineteen digit number based upon the form of payment instrument. In other embodiments, the customer token may assume other formats, including alphabetical, special characters, and/or alphanumerical.

Referring now specifically to FIG. 5A, user interfaces for a returning customer are shown when the pre-transaction system 125 determines that the current transaction is likely not fraudulent. The pre-transaction system 125 is activated upon the customer starting a checkout process on a merchant website 500 during the current transaction. The customer may initiate the checkout process by clicking on a checkout button 505. Upon clicking on the checkout button 505, a data collection system 510 sends device data and contextual data to the pre-transaction system 125, which starts the authentication process (e.g., the process 400), as indicated in dialog box 513. Specifically, the pre-transaction system 125 may retrieve the customer token associated with the customer, as well as establish communication with one or more networks to authenticate the computing device on which the merchant website 500 is accessed in the current transaction, authenticate the customer, and authenticate the payment instrument associated with the customer token. Thus, the pre-transaction system 125 performs the process 400 for the customer.

If the pre-transaction system 125 determines (from the process 400) that the current transaction is likely not a fraudulent transaction, the pre-transaction system greatly simplifies the checkout process for the customer. Specifically, the pre-transaction system 125 displays a user interface 515 as part of the checkout process. The user interface 515 includes a dialog box 520, which displays a unique code associated with the customer. The unique code is known to the customer. In some embodiments, the pre-transaction system 125 may generate the unique code when the customer token is generated for the customer, and send the unique code to the customer. If the customer recognizes the unique code in the dialog box 520, the customer may simply click on a buy button 525 to complete the current transaction. Upon clicking the buy button 525, the pre-transaction system 125 presents a payment page 530 on which the payment information (e.g., name of payment instrument holder, billing address, credit card number, expiration date, security code, etc.) associated with the payment instrument of the customer from the customer token is auto-filled, as indicated by dialog box 535. If multiple payment instruments are associated with the customer in the customer token, the pre-transaction system 125 may designate a default payment instrument, use the payment instrument used by the customer in the previous transaction, or present the list of all payment instruments to the customer and allow the customer to choose.

The pre-transaction system 125 may also request the customer to enter their telephone number within the payment page 530. The pre-transaction system 125 may match the entered phone number with the phone number of the customer in the customer token, as an added security feature. If the phone numbers match, the pre-transaction system 125 may complete the transaction by displaying a user interface 540. If the phone numbers do not match, the pre-transaction system 125 may display an error message and/or take other action. In some embodiments, the pre-transaction system 125 may verify the phone number before auto-filling the payment information within the payment page 530. In some embodiments, the customer may elect to use a payment instrument on the payment page 530 that is not associated with the customer token. In such a case, the pre-transaction system 125 may initiate a 3DS protocol to authenticate the new payment instrument, and upon authenticating that payment instrument, add the payment instrument to the customer token, as also indicated in the dialog box 535. If the 3DS protocol authenticates the new payment instrument, the pre-transaction system 125 completes the transaction by displaying the user interface 540.

Additionally, on the user interface 515, if the customer does not recognize the unique code (e.g., has forgotten the unique code or the unique code is different from what the customer has) displayed within the dialog box 520, the customer may click on button 545, which sends a message to the pre-transaction system 125. Upon receiving the message, the pre-transaction system 125 may present the payment page 530, without pre-filling the payment information. The pre-transaction system 125 may allow the customer to enter the payment information and initiate the 3DS protocol. If the 3DS protocol authenticates the payment instrument, the pre-transaction system 125 may complete the transaction, update the customer token, assign a new unique code to the customer, and send the unique code to the customer for future transactions.

Thus, for a returning customer, if the pre-transaction system 125 determines that the transaction is likely not fraudulent, the pre-transaction system greatly simplifies the checkout process by storing and pre-filling in the payment information and allowing for a quick checkout, thereby improving customer experience, and increasing the chances of the customer of returning to the merchant website 500 in the future.

FIG. 5B shows user interfaces for a returning customer and when the pre-transaction system 125 determines that the current transaction is likely a fraudulent transaction. Again, the pre-transaction system 125 is activated when the customer starts the checkout process on the merchant website 500 by clicking on the checkout button 505. The pre-transaction system 125 retrieves the customer token associated with the customer and performs the process 400 to determine whether the current transaction is fraudulent. If the pre-transaction system 125 determines that the current transaction has a high likelihood of being fraudulent, the pre-transaction system presents the user interface 515 without the dialog box 520 and without the unique code within the dialog box. It is to be understood that the customer may have a unique code associated therewith, which may have been displayed in past transactions, however since the pre-transaction system determines the current transaction to be likely fraudulent, the pre-transaction system does not display the dialog box 520 and the unique code.

The customer may click on buy button 550 to open payment page 555 in which the payment information from the customer token is not auto-filled. The pre-transaction system 125 may request the customer to fill in the payment information associated with the payment instrument that the customer desires to use. Upon receiving the payment information of the payment instrument, the pre-transaction system 125 starts a 3DS protocol. In some embodiments, the pre-transaction system 125 may also measure the effectiveness of the 3DS protocol to authenticate the customer. For example, if the customer has a high device score and customer score but the 3DS protocol has indicated in the past that the customer is likely not trustworthy, the pre-transaction system 125 may opt to start the 3DS protocol for additional authentication.

Further, although not shown, the pre-transaction system 125 may also request the customer to enter their phone number on the payment page 555. When the 3DS protocol is initiated, the provider institution associated with the payment instrument sends the customer a one-time use password or code on a device of the customer registered with the provider institution. The customer may enter the one-time use password or code within field 560 of user interface 565. If the code is valid (e.g., matches the code sent by the provider institution), the pre-transaction system 125 allows the transaction to complete. If the code is invalid or if the customer fails to enter a code, the pre-transaction system may present a user interface 570.

Via the user interface 570, the pre-transaction system 125 may allow the user to use alternate, more secure methods of payments. The user interface 570 may present one or more payment options 575 for the customer to select and complete the transaction. If the customer decides not to select any of the payment options 575, the pre-transaction system 125 may deny the transaction and update the customer token. Thus, the pre-transaction system 125 detects and prevents a likely fraudulent transaction from going through.

FIG. 5C shows user interfaces for a new customer. Again, the pre-transaction system 125 is activated when the customer starts the checkout process on the merchant web site 500 by clicking on the checkout button 505. The pre-transaction system 125 receives device data and contextual data from the data collection system 510. However, since the customer is new, the pre-transaction system 125 does not have a customer token associated with the customer. The pre-transaction system 125 creates a customer token for the customer, as well as performs the process 400 to analyze whether the current transaction is likely fraudulent or not, as indicated in the dialog box 580. Upon completing the analysis, the pre-transaction system displays the user interface 515, which is similar to the user interface in FIG. 5B. Specifically, the user interface 515 does not have the dialog box 520. The customer may click on buy button 550 to come to payment page 585, where the payment information is not auto-filled. The customer may fill in the payment information, which the pre-transaction system 125 may add to the customer token.

When the customer fills in the payment information associated with a payment instrument, the pre-transaction system 125 may determine whether the payment instrument is associated with the customer and valid. If the pre-transaction system 125 determines that the payment instrument is indeed associated with the customer and valid, the pre-transaction system allows the transaction to complete by displaying user interface 590. On the other hand, if the pre-transaction system 125 doubts the validity of the payment instrument, the pre-transaction system may initiate the 3DS protocol, as in FIG. 5B, and possibly requests the customer to use alternate forms of payments.

Figure 6:
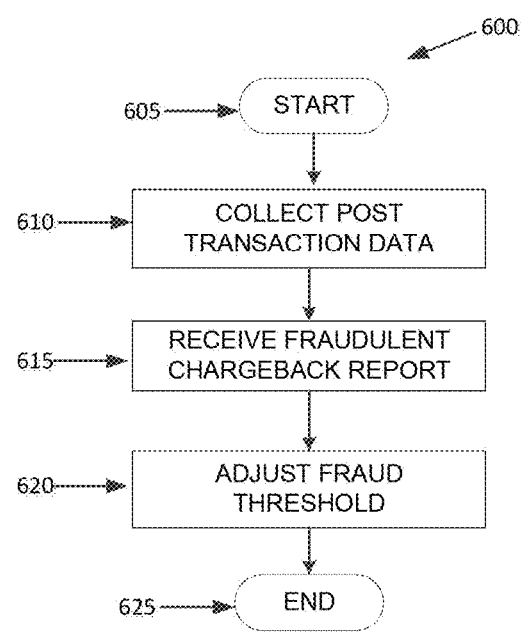
FIG. 6 is an example flowchart outlining operations of a post-transaction system of the decision making system, in accordance with some embodiments of the present disclosure.

Referring now to FIG. 6, an example flowchart outlining operations of a process 600 are shown, in accordance with some embodiments of the present disclosure. The process 600 may include fewer, additional, or other operations depending upon the particular embodiment. The process 600 is discussed in conjunction with FIG. 1. The process 600 is implemented by the post-transaction system 130. By implementing the process 600, the post-transaction system adjusts the fraud threshold that is used by the pre-transaction system 125 at the operation 430. In some embodiments, the fraud threshold may be a number between zero and one, with zero being the lowest likelihood of fraud and one being the highest likelihood of fraud. A fraud threshold of one half (0.5) may be indicative of inconclusive fraud and may require additional information/authentication to determine the likelihood of fraud. In some embodiments, the fraud threshold may be computed from computer modeling using regional (e.g., region where a particular transaction is completed) data of fraudulent transactions.

Further, in some embodiments, a single fraud threshold may be used for all transactions occurring under the decision making system 100. In other embodiments, multiple fraud thresholds may be used. For example, in some embodiments, the decision making system 100 may define geographical regions and each geographical region may have its own fraud threshold. By virtue of having separate fraud thresholds for each region, the fraud threshold may be tailored based upon the fraudulent activity in that region. Each geographical region may include one or more states, one or more counties, one or more cities, one or more zipcodes, one or more neighborhoods, any combination of the above, or any other geographical division.

Additionally, the fraud threshold is configured to continually update based upon past data related to fraudulent transactions. In some embodiments, the fraud threshold may be updated based on computer modeling implemented using machine learning and artificial intelligence. Data points indicative of past fraudulent transactions may be gathered, weighed, and assessed. The post-transaction system 130 may be configured to adjust the fraud threshold periodically (e.g., once or twice a month).

Thus, upon starting at operation 605, the post-transaction system 130 receives post-transaction data from the pre-transaction system 125 at operation 610. The post-transaction data that the post-transaction system 130 receives may not be customer specific. Thus, the post-transaction system 130 may receive post-transaction data for several customers and store the post-transaction data within a memory associated with the post-transaction system. From the post-transaction data, the post-transaction system 130 may flag transactions that were determined to be fraudulent. At operation 615, the post-transaction system 130 may also receive a fraudulent chargeback report from one or more networks (e.g., credit card network). The chargeback report may identify transactions, which were reported to (or were determined by the network) to be fraudulent. In some embodiments and particularly in those embodiments in which the fraud threshold is based on regions, the post-transaction data of the operation 610 and the fraudulent chargeback report of the operation 615 may correspond to the past-transaction data and fraudulent chargeback report, respectively, of the region for which the fraud threshold is being updated.

At operation 620, the post-transaction system 130 may compare the fraudulent transactions identified from the post-transaction data with the fraudulent transactions identified in the chargeback report to determine how many of the transactions identified as fraudulent in the post-transaction data were actually fraudulent. Based upon the comparison, the post-transaction system 130 updates the fraud threshold at the operation 620. For example, if all of the transactions identified from the post-transaction data as fraudulent were verified (from the chargeback report) as indeed being fraudulent, the post-transaction system 130 may keep the fraud threshold unchanged. On the other hand, if the post-transaction system 130 determines that more transactions were identified as fraudulent from the post-transaction data than were actually verified by the chargeback report, the post-transaction system may adjust the fraud threshold. In other words, if the post-transaction system 130 determines that the pre-transaction system 125 found more transactions to be fraud than actually were, the post-transaction system may determine that fewer fraudulent transactions were occurring, and therefore, adjust (e.g., increase or decrease) the fraud threshold. Similarly, if the post-transaction system 130 determines that the pre-transaction system 125 did not catch certain transactions that were actually fraudulent, the post-transaction system may adjust (e.g., decrease or increase) the fraud threshold.

Thus, the post-transaction system 130 continually updates and refines the fraud threshold to increase the accuracy of finding fraudulent transactions. The process 600 ends at operation 625.

It is to be understood that any examples used herein are simply for purposes of explanation and are not intended to be limiting in any way. It is also to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
    receiving, by a computer system, device data associated with a computing device used by a customer during a checkout process of a current transaction on a merchant web site;
    receiving, by the computer system, contextual data associated with the customer during the checkout process;
    retrieving, by the computer system, a customer token associated with the customer, wherein the customer token is associated with a payment instrument of the customer;

assigning, by the computer system, the computing device a device score and the customer a customer score based on the device data and the contextual data;

computing, by the computer system, an overall score from the device score and the customer score;

comparing, by the computer system, the overall score with a fraud threshold selected from a plurality of fraud thresholds, the fraud threshold selected based on a geographical region in which the transaction is being completed;

determining, by the computer system and based on the comparison, that the current transaction is not fraudulent before the current transaction is completed;

for each of the plurality of fraud thresholds, updating, by the computer system, the respective fraud threshold based upon past fraudulent transactions on the merchant website and a chargeback report received by the computer system in response to determining the past fraudulent transactions were completed in a geographical region that corresponds to the respective fraud threshold; and auto-filling, by the computer system, payment information associated with the payment instrument in the customer token during the checkout process of the merchant web site to complete the current transaction upon determining that the current transaction is not fraudulent.

2. The method of claim 1, further comprising creating, by the computer system, the customer token and associating the payment instrument of the customer with the customer token in a previous transaction by the customer on the merchant website.

3. The method of claim 1, wherein the computer system receives the device data and the contextual data from a data collection system associated with the merchant web site.

4. The method of claim 1, further comprising displaying a unique code on a user interface of the checkout process, wherein the unique code is associated with the customer.

5. The method of claim 4, wherein the computer system receives indication from the customer requesting to complete the current transaction, and wherein the computer system auto-fills the payment information upon receiving the indication.

6. The method of claim 1, wherein the computer system sends at least a portion of the device data to a device network, wherein the computer system receives a device profile back from the device network, and wherein the computer system computes the device score based on the device profile.

7. The method of claim 1, wherein the computer system sends at least a portion of the contextual data to a provider network, and wherein the computer system receives a customer profile back from the provider network, and wherein the computer system computes the customer score based on the customer profile.

8. The method of claim 7, wherein the customer profile includes information about whether the customer has engaged in fraudulent transactions in the past on the merchant website.

9. A system comprising:
a data collection system associated with a merchant website, wherein the data collection system is configured to collect device data from a computing device used by a customer during a checkout process of a current transaction on the merchant website and contextual data related to the customer; and a computer system configured to receive the device data and the contextual data from the data collection system, wherein the computer system comprises a memory to store the device data and the contextual data, and a processing unit configured to:
retrieve a customer token associated with the customer, wherein the customer token is associated with a payment instrument of the customer;
assign the computing device a device score and the customer a customer score based on the device data and the contextual data;
compute an overall score from the device score and the customer score;
compare the overall score with a fraud threshold selected from a plurality of fraud thresholds, the fraud threshold selected based on a geographical region in which the transaction is being completed;
determine, based on the comparison, that the current transaction is not fraudulent before the current transaction is completed;
for each of the plurality of fraud thresholds, update the respective fraud threshold based upon past fraudulent transactions on the merchant website and a chargeback report received by the computer system in response to determining the past fraudulent transactions were completed in a geographical region that corresponds to the respective fraud threshold; and
auto-fill payment information associated with the payment instrument in the customer token during the checkout process of the merchant website to complete the current transaction upon determining that the current transaction is not fraudulent.

10. The system of claim 9, wherein the computer system is further configured to communicate with one or more networks to obtain a device profile and a customer profile, and wherein the computer system computes the device score and the customer score based at least upon the device profile and the customer profile, respectively.

11. A non-transitory computer readable media with computer- executable instructions embodied thereon that, when executed by a processor of a computer system associated with a merchant website, cause the computer system to perform a process comprising:
receiving device data associated with a computing device used by a customer during a checkout process of a current transaction on the merchant web site;
receiving contextual data associated with the customer during the checkout process;
retrieving a customer token associated with the customer, wherein the customer token is associated with a payment instrument of the customer;
assigning the computing device a device score and the customer a customer score based on the device data and the contextual data;
computing an overall score from the device score and the customer score;
comparing the overall score with a fraud threshold selected from a plurality of fraud thresholds, the fraud threshold selected based on a geographical region in which the transaction is being completed;
determining, based on the comparison, that the current transaction is not fraudulent before the current transaction is completed;
for each of the plurality of fraud thresholds, updating the fraud threshold based upon past fraudulent transactions on the merchant web site and a chargeback report received by the computer system in response to determining the past fraudulent transactions were completed in a geographical region that corresponds to the respective fraud threshold; and auto-filling payment information associated with the payment instrument in the customer token during the checkout process of the merchant website to complete the current transaction upon determining that the current transaction is not fraudulent.

12. The non-transitory computer readable media of claim 11, wherein the processor is further configured to display a unique code on a user interface of the checkout process, and wherein the processor waits to receive indication from the customer requesting to complete the current transaction before auto-filling the payment information.

13. A method comprising:
creating, by a computer system, a customer token during a checkout process of a current transaction on a merchant web site;
receiving, by the computer system, device data related to a computing device used by the customer during the current transaction and contextual data related to the customer;
assigning, by the computer system, the computing device a device score and the customer a customer score based on the device data and the contextual data;
computing, by the computer system, an overall score from the device score and the customer score;
comparing, by the computer system, the overall score with a fraud threshold selected from a plurality of fraud thresholds, the fraud threshold selected based on a geographical region in which the transaction is being completed;
determining, by the computer system and based on the comparison, that the current transaction is not fraudulent before the current transaction is completed;
for each of the plurality of fraud thresholds, updating, by the computer system, the fraud threshold based upon past fraudulent transactions on the merchant website and a chargeback report received by the computer system in response to determining the past fraudulent transactions were completed in a geographical region that corresponds to the respective fraud threshold;
receiving, by the computer system, payment information associated with a payment instrument from the customer during the checkout process;
associating, by the computer system, the payment instrument with the customer token; and
completing, by the computer system, the current transaction.

14. A method comprising:
receiving, by a computer system, device data associated with a computing device used by a customer during a checkout process of a current transaction on a merchant web site;
receiving, by the computer system, contextual data associated with the customer during the checkout process;
retrieving, by the computer system, a customer token associated with the customer, wherein the customer token is associated with a payment instrument of the customer;
assigning, by the computer system, the computing device a device score and the customer a customer score from the device data and the contextual data;
computing, by the computer system, an overall score from the device score and the customer score;
comparing, by the computer system, the overall score with a fraud threshold selected from a plurality of fraud thresholds, the fraud threshold selected based on a geographical region in which the transaction is being completed;
determining, by the computer system, the overall score exceeds the fraud threshold;
initiating, by the computer system, a first additional security protocol to confirm whether the current transaction is fraudulent in response to determining the overall score exceeds the fraud threshold; and
for each of the plurality of fraud thresholds, updating, by the computer system, the fraud threshold based upon past fraudulent transactions on the merchant website and a chargeback report received by the computer system in response to determining the past fraudulent transactions were completed in a geographical region that corresponds to the respective fraud threshold.

15. The method of claim 14, wherein the additional security protocol is a 3D secure protocol.

16. The method of claim 14, wherein the computer system directs the customer to complete the current transaction using alternative payment methods upon being unable to confirm that the current transaction is not fraudulent based upon the initiating the additional security protocol.

17. The method of claim 6, wherein the computer system computes the device score based on the device profile by determining the computing device is currently not stolen and is currently privately owned.

18. The method of claim 1, wherein the checkout process comprises second additional security protocols configured to be implemented when any overall scores exceed the fraud threshold, and wherein the computer system removes the second additional security protocols from the checkout process in response to determining the current transaction is not fraudulent.

* * * * *